July 11, 1961

R. L. GRAY ET AL 2,992,393

MAGNETIC COUNTER CIRCUIT

Filed Oct. 19, 1955

INVENTORS
ROBERT L. GRAY
DAVID A. STARR, JR.

BY George Baron

ATTORNEY 2,992,393

MAGNETIC COUNTER CIRCUIT

Robert L. Gray, Broomall, and David A. Starr, Jr., Berwyn, Pa., assignors to Burroughs Corporation, Detroit, Mich., a corporation of Michigan Filed Oct. 19, 1955, Ser. No. 541,477
13 Claims. (Cl. 328—40)

This invention relates to magnetic storage devices and more particularly to magnetic storage devices capable of being stepped in a plurality of discrete stable steps.

Static magnetic core devices of the conventional type utilize the two retentivity points of a magnetic core as the two stable states of said core, namely, one having a positive remanent state and the other a negative remanent state. Suitable interrogation means are applied to such a conventional type magnetic core in order to determine its remanence history, e.g., whether the core is in a negative or a positive remanent condition. In logic and arithmetic operations, therefore, at least one of these conventional cores is required for each binary digit.

It is desirable to be able to employ a single core that can be stepped to a plurality of remanent stable states so that one can reduce the number of cores and their associated components in performing logic or arithmetic. Moreover, by increasing the number of discrete remanent states in which a core can be placed, one is not restricted in system design to a binary code. One may step a core into enough discrete remanent states so that the multistable magnetic core can produce a carry output when the multistable state device has reached its fourth, fifth, sixth or *n*th stable state.

In an application by Chen and Tracy, Serial No. 498,257, entitled "Magnetic Device," filed on March 31, 1955, and assigned to the same assignee as applicants' assignee, there is shown and described a circuit for utilizing a bistable core, referred to in said application, as well as herein, as a quantizing core. The switching of such quantizing core from one of its bistable states to its other bistable state serves to step another core, called the count core, a plurality of discrete stable states. The quantizing core has the conventional square hysteresis loop characteristic. When a magnetic field of sufficient magnitude to switch the core is applied to the quantizing core, the core switches from one retentivity point to its opposite retentivity point. Such a switched core presents a fixed change of flux linkage with an output winding associated with the switched quantizing core and therefore upon successive switchings produces a succession of pulses of substantially equal volt-second integral. The multistable or count core, which also has a rectangular hysteresis loop, is driven by the output pulse induced in the closed output circuit loop associated with the quantizing core. The output circuit is so designed that the count core has its magnetization increased from its initial boundary retentivity state through a plurality of intermediate retentivity or remanent states towards its opposite or second boundary retentivity state by a definite reproducible amount each time the quantizing core switches.

When, after repeated switchings of the quantizing core, the count core just reaches saturation, whereupon it relaxes to its second boundary retentivity or last discrete stable, state to await the next switching of the quantizing core, the circuit coupling the quantizing core to the count core is such that the next output pulse induced in the output circuit loop by the switching of the quantizing core will drive the count core into saturation and cause a reset of said count core to its initial boundary retentivity state. Thus, if the flux linkage between the quantizing core and the multistable or count core is such as to cause the count core to reach its last stable state after $n$ switchings of the quantizing core, the $(n+1)$th switching of the quantizing core will cause the count core to be returned to its initial boundary retentivity state. Such return of the count core to its initial retentivity state is sensed by a suitable detector, and such sensing is representative of the number of times the multi-stable core was stepped prior to its being reset to its initial retentivity state.

There are shown, in the above noted application by Chen and Tracy, a number of ways for resetting the count core to its initial boundary retentivity state after such count core has been stepped to its last discrete stable state. In one embodiment of the resetting circuit, a resistor is placed in the transfer loop coupling the quantizing core with the count core, and this resistor is in series with the input winding associated with the count core. The potential developed across this resistor is applied to the grid of a tube, said tube acting as a switch in a circuit that is coupled to the count core and is designed to supply switching energy to the count core when the potential of the grid is made sufficiently positive to cause firing of the tube.

While the count core is being stepped in discrete intervals, the core represents a relatively high impedance to the current induced in the transfer loop by the switching of the quantizing core. As a consequence, most of the potential drop is across the input winding of the count core and negligible potential is developed across the resistor. However, when the count core has been stepped to its last discrete stable state, the count core thereafter presents a low impedance to the current induced in the transfer loop by the switching of the quantizing core, and a substantial potential drop takes place across the resistor. This increase in potential drop across the resistor causes a change in grid bias of the tube and the tube fires, causing switching energy to be applied to the count core so as to return the count core to its initial retentivity state.

It has been observed that due to the lack of "squareness" of the hysteresis loop of the count core, the voltage appearing across the resistor of the transfer loop, and consequently the voltage at the grid of the reset tube, increases as one steps up the count core close to the saturation level of the hysteresis curve of the count core. Thus the voltage pulse appearing at the grid will have the highest amplitude when the count core is switched from its last stable state into its flux saturation state of the same polarity; but the voltage pulse appearing at the grid of the tube when the count core is switched from its penultimate stable state to its last stable state, while not as high in amplitude as that which appears when the count core was switched from its last stable state into its flux saturation state, is nevertheless sufficiently high so that the ratio of the two voltage pulses is low. This low ratio is undesirable because it fails to provide the discrimination between the stepping of the count core from the penultimate stable state to its last stable state and the driving of the count core from its last stable state into flux saturation.

The present invention increases this ratio to such an extent that one can unequivocably distinguish between the voltage pulse appearing at the grid of the reset tube when the count core is switched from its last stable state and the other voltage pulses appearing at the grid during the step by step switching of the count core.

Applicant attains this increased ratio by employing a capacitor and a winding in the circuit connecting the resistor to the grid of the reset tube. The winding is coupled to the count core in such a manner that when a positive voltage is developed across the resistor as a consequence of the switching of the quantizing core and the stepping of the count core a discrete interval along its hysteresis curve, a negative voltage is developed at the same time across the winding because of the change in flux in that winding due to the stepping of the count core. The capacitor integrates these opposing voltages so that the resultant voltage other than an existing negative bias on the grid of the reset tube is substantially zero. When the count core is in its last stable state, the current induced in the transfer loop coupling the quantizing core with the count core by the switching of the quantizing core will not step the count core, because the count core is now saturated. As a consequence, the inductance winding will not generate a negative voltage to offset the positive voltage developed across the resistor. This positive voltage is fully applied to the grid of the reset tube to overcome the existing negative bias to initiate firing of the reset tube.

Therefore, it is an object of this invention to attain an improved transfer circuit for a system employing magnetic cores.

It is a further object to obtain an improved signal to noise ratio in a magnetic circuit employing a multi-stable core.

It is yet another object to improve the accuracy of operation generally of a multi-stable core.

For a better understanding of the invention, together with further objects and advantages thereof, reference should be had to the following description taken in conjunction with the accompanying drawings, wherein.

Figure 1:
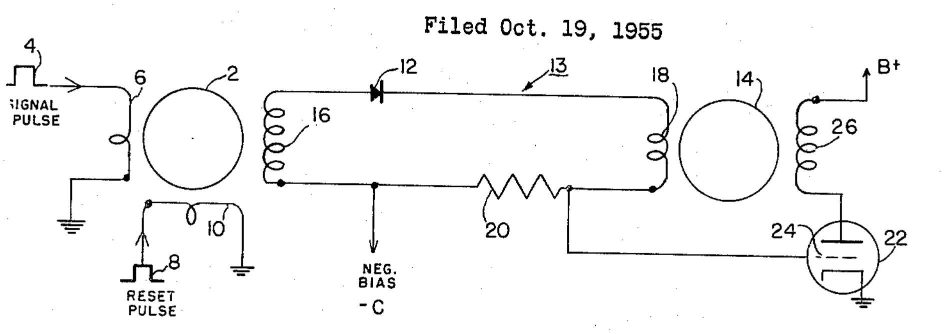
FIGURE 1 is a showing of a circuit employed for resetting a multi-stable or count core, such circuit being substantially as that shown and claimed in the Chen-Tracy application, Serial No. 498,257, filed March 31, 1955.

In FIGURE 1 there is shown a magnetic core 2 which is driven toward its positive magnetic saturation level when a signal pulse 4 occurs to cause a current pulse to enter the undotted terminal of winding 6. When the signal pulse 4 terminates, magnetizing energy is no longer applied to core 2 and the core 2 relaxes to the positive retentivity level of its B–H curve. When a reset pulse 8 occurs to cause a current pulse to enter the dotted terminal of winding 10, core 2 is switched towards its negative saturation state, to relax to its negative retentivity state when reset pulse 8 terminates.

The diode 12 of the transfer loop 13, which couples quantizing core 2 with the count core 14, is oriented so that the voltage induced in output winding 16 of quantizing core 2 because of the switching of core 2 from one bistable state to its other bistable state will cause current to flow in said loop 13 only when the signal pulse 4 does the switching. No induced current flows in transfer loop 13 when the reset pulse 8 switches core 2 toward its negative retentivity state, because each time reset pulse 8 is applied to winding 10, core 2 switches from its positive retentivity state towards its negative retentivity state, and the induced current in transfer loop 13 is in the direction of high impedance of diode 12. The induced current flow through winding 18 when signal pulse 4 switches core 2 will step count core 14 a fixed reproducible interval upward along its B–H curve. The switching of quantizing core 2 has supplied a fixed quantum of flux energy in the form of a voltage pulse of a fixed volt-second integral to be applied towards the stepping of count core 14 in discrete intervals towards its positive boundary retentivity state.

When the count core 14 has not reached its last stable state or its positive boundary retentivity state, the impedance of winding 18 will be high so that current flow in transfer loop 13 will be low and, as a consequence, the voltage drop across resistor 20 is relatively small. When the count core 14 has reached its last stable state, the switching of quantizing core 2 toward its positive retentivity state will cause induced current to flow through transfer loop 13, but this induced current will see winding 18 as a low impedance element, resulting in a relatively high voltage drop across resistor 20. The negative bias −C is set so that the high impedance state of winding 18 will prevent sufficient voltage from being developed across resistor 20 to overcome such bias and fire tube 22. But when winding 18 is a low impedance, which is the case when count core 14 is in its last stable state, a sufficient voltage drop occurs across resistance 20 to overcome the negative bias −C on grid 24 of tube 22 to cause tube 22 to fire. Current from the +B source of supply flows through reset winding 26 to switch count core 14 toward its negative retentivity state. Due to the flux change in the switching of core 14, there is an output voltage produced at winding 18 which causes a current flow through and hence a voltage drop across resistor 20 of such polarity as to further activate the tube 22, resulting in a regenerative switching of count core 14. When the count core 14 reaches its negative saturation state, there is no longer an output at winding 18 so the grid 24 returns to its −C bias value to deactivate tube 22.

The invention of FIGURE 1 requires close tolerances when the count core 14 has a characteristic hysteresis loop that is not "square," and thereby does not always present the same impedance to current flow in winding 18 from quantizing core 2 even prior to the last stable state of the core. For example, in FIGURE 4 of the drawing, there is shown a graphical representation of pulses occurring when count core 14 is stepped to ten discrete remanent states. For the first seven steps, the pulses 1–7 represent the output voltages produced across resistor 20 when the count core 14 is being stepped towards its positive boundary retentivity state or its last stable state. It is seen that such voltages are substantially the same and are low enough in amplitude so that the negative bias −C on grid 24 of tube 22 is not overcome above cut-off. When the count core 14 is stepped toward its eighth remanent stable state, dotted rectangle 30 represents the potential developed across resistor 20, due to the fact that the count core 14 will present a lower impedance in the transfer loop 13 when the count core 14 is being switched to its eighth stable state. Dotted rectangle 32 represents the potential developed across resistor 20 when the count core 14 is being switched to its ninth stable state. Rectangle 34 represents the potential developed across resistor 20 when the count core 14 has reached its last stable state and is a low impedance path to current flowing in transfer loop 13 as a consequence of the switching of quantizing core 2. This potential is now sufficient to overcome the negative cut-off bias −C on grid 24 and cause the regenerative resetting of count core 14.

Figures 3, 4:
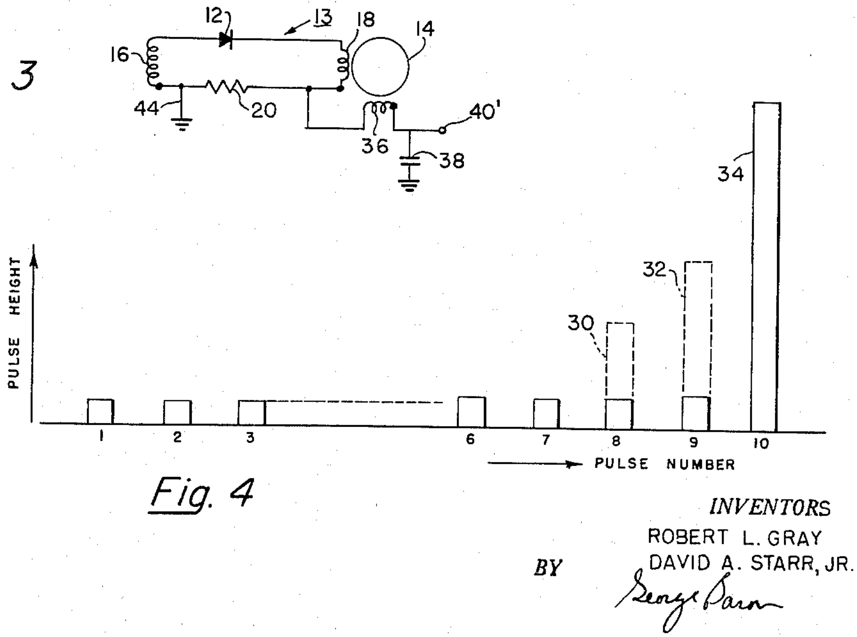
FIGURE 3 is a circuit diagram of another embodiment of the invention shown in FIGURE 2.
FIGURE 4 is a pulse diagram relating the amplitudes of the pulses obtained in the output circuit of the invention with the number of times that the multiple state core has been switched.

As can be seen in FIGURE 4, the pulse heights at steps eight and nine of count core 14 are too high so that the ratio of the voltage of the tenth pulse number to the voltage at the ninth pulse number, or to the voltage at the eighth pulse number, is low, interfering with the reliability of the reset operation of the count core 14.

Figure 2:
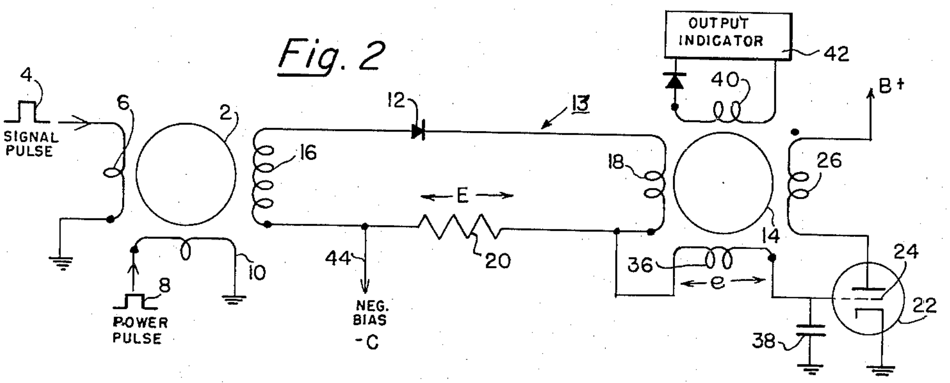
FIGURE 2 is a showing of an embodiment of the invention setting out an improvement over the circuit shown in FIGURE 1.

In FIGURE 2 there is shown a circuit for increasing the value of the aforementioned ratio. The circuit is similar to that shown in FIGURE 1 save that another winding, compensating winding 36, about core 14 and a capacitor 38, with one plate grounded and the other plate connected to the grid 24 as shown, are added to the grid 24 circuit of tube 22. Now as core 14 is stepped in discrete stable states up its B–H curve by the output voltage produced by the switching of quantizing core 2, a voltage $e$ of opposite polarity to that voltage E across resistor 20 is generated across winding 36. Capacitor 38 integrates these opposing voltages so that the net integrated voltage $E-e$ at step 9 is substantially zero and is negative for all the steps less than step 9. By the proper selection of turns on winding 36, $E-e$ can be made zero at step 9, which makes E less positive and $e$ more negative at all other counts less than 9. However when the count core 14 is in its last stable state, the switching of quantizing core 2 will cause current flow through transfer loop 13, but such induced current will see count core 14 as a low impedance element in its path. Consequently count core 14 is not stepped up along its B–H hysteresis loop save along its magnetic saturation curve, and negligible voltage is generated in winding 36. However capacitor 38 is charged to the peak voltage E appearing across resistor 20 because $e$ is substantially zero, and tube 22 fires to reset count core 14. Winding 40 senses the reset of count core 14 and this sensing is fed into an output indicator 42. Indicator 42 serves as a decade counter in that it counts every ten switchings of quantizing core 2. When the circuit of FIGURE 2 is employed, the relative pulse heights of the voltages appearing at the grid 24 of tube 22 are shown in solid lines in FIGURE 4.

In yet another embodiment of the invention, it is possible, by a proper selection of the resistor 20, inductance winding 36, and capacitor 38 to dispense with resetting tube 22, reset winding 26 and its attendant power supply. This is shown in FIGURE 3 wherein at the last positive remanent stable state of count core 14 the full potential is developed across resistor 20 because count core 14 and its associated input winding 18 present a low impedance path to the driving current passing through transfer loop 13. When the driving current terminates, capacitor 38 discharges through the dotted terminal of compensating winding 36, resistor 20, and through ground via lead 44. The discharge path, being through the dotted terminal of winding 36, will switch count core toward its negative retentivity state, ready for the start of a new stepping cycle.

In the embodiment of FIGURE 3, one could obtain a count of ten in count core 14 before resetting was accomplished using twenty wraps of ½ mil Orthonik on cores of ⅜" diameter. Winding 16 had 100 turns, winding 18 had 200 turns, and winding 36 had 600 turns. The capacitor 38 had a value of approximately 0.022 microfarad and resistance 20 was of the order of 750 ohms. The frequency of power pulses 8 was of the order of three kilocycles and the ratio of the voltage $E_1$ at a count of ten to the $E_2$ at the count of nine at output terminal 40' was 12:1, a ratio that represents very good discrimination between a desirable output pulse and an undesirable output pulse.

It is to be understood that the count core 14 could be partially reset if desired. By selecting the proper values for resistor 20, capacitor 38, and winding 36, the amount of charge appearing on capacitor 38, and, consequently, the amount of current available to reset count core 14, can be controlled. Instead of resetting count core 14 to zero, one may reset the count core 14 to eight, seven, five or to any number less than the last count step of counter core 14. The R–C time constant is large and the inductance of winding 36 is kept low so that no disturbing ringing takes place in the reset circuit.

Thus it is seen that the instant invention has increased the reliability of operation of a multistable count core without substantially adding to the complexity of prior art multi-stable count core circuits.

What is claimed is:

1. A counter circuit comprising: a first magnetic core capable of assuming either of two stable states of magnetic remanence; a second magnetic core of high magnetic retentivity and capable of being switched from a boundary state of magnetic remanence of reference polarity to a boundary state of opposite polarity in $n$ discrete steps each corresponding to a change in flux density, where $n$ is an integer larger than one; a transfer loop interconnecting said first and second cores, said transfer loop including an output winding coupled to said first core, an input winding coupled to said second core, an asymmetrically conducting device connecting one end of said output winding to one end of said input winding, and a resistance connecting the other end of said output winding to the other end of said input winding, said transfer loop also including a series circuit connected in shunt across said resistance, said series circuit comprising a compensating winding coupled to said second core, a capacitor and a source of negative bias voltage for charging said capacitor through said resistance and compensating winding to a negative biasing potential; an amplifier device having input and output circuits, said output circuit including a third winding coupled to said second core; means connecting said capacitor in shunt across the input circuit of said amplifier for biasing said amplifier beyond cut-off; means responsive to the first of a series of pulses to be counted for switching said first core from one to the other of its stable states for inducing a voltage in said first-core output winding to drive a pulse of transfer current around said transfer loop and through said second-core input winding to change the flux density in said second core by an amount corresponding to one of said $n$ discrete steps, thereby in response to said flux change to induce a voltage in said compensating winding of a polarity to oppose the flow of transfer current into said capacitor, thereby to maintain said capacitor negatively charged and said amplifier biased beyond cut-off; and means for resetting said first core to said one stable state in preparation for the next pulse to be counted, thereby, after a succession of applied pulses to be counted and a consequent succession of transfer-current pulses in response to repeated switchings of said first core, to drive the flux density of said second core to said boundary state of magnetic remanence of said opposite polarity, said input and compensating windings thereupon presenting low impedance to the next pulse of transfer current which is thereupon effective to charge said capacitor to a positive potential sufficient to override said negative biasing potential, thereby to drive said amplifier device into conduction and thereby to drive current through the output-circuit winding of said amplifier to reset said second core to said boundary state of reference polarity.

2. Apparatus as claimed in claim 1 characterized in the provision of means responsive to the resetting of said second core to said boundary state of reference polarity for developing an $(n+1)$ count signal.

3. Apparatus as claimed in claim 2 further characterized in that said output-circuit winding of said amplifier and said compensating winding are regeneratively poled so that said current through said output-circuit winding induces in said compensating winding a voltage of a polarity to continue said amplifier in conduction until said second core is completely reset.

4. Apparatus as claimed in claim 2 further characterized in that both said input and said compensating windings are so poled relative to said output-circuit winding of said amplifier that said current through said output-circuit winding induces in both said input and compensating windings voltages of the same polarity and of a magnitude to maintain said amplifier biased for conduction until the second core is completely reset.

5. A counter circuit comprising: a magnetic core of high magnetic retentivity and capable of being switched from a boundary state of magnetic remanence of reference polarity to a boundary state of opposite polarity in $n$ discrete steps each corresponding to a change in flux density, where $n$ is an integer larger than one; an input winding coupled to said core; a resistance having one end connected to one end of said input winding; a series circuit connected in shunt across said resistance, said series circuit comprising a compensating winding coupled to said core, a capacitor and a source of negative bias voltage for charging said capacitor through said resistance and compensating winding to a negative biasing potential; an amplifier device having input and output circuits, said output circuit including a third winding coupled to said core; means connecting said capacitor in shunt across the input circuit of said amplifier for biasing said amplifier beyond cut-off; means for connecting a source of spaced-apart pulses to be counted, each of substantially equal volt-second integral, between the other end of said input winding and the other end of said resistance for driving, in response to a pulse to be counted, a current pulse through said input winding to change the flux density in said core by an amount corresponding to one of said $n$ discrete steps, thereby in response to said flux change to induce a voltage in said compensating winding of a polarity to oppose the flow of pulse current into said capacitor, thereby to maintain said capacitor negatively charged and said amplifier biased beyond cut-off, thereby, after a succession of pulses to be counted and a consequent succession of current pulses through said input winding, to drive the flux density of said core to said boundary state of magnetic remanence of said opposite polarity, said input and compensating windings thereupon presenting low impedance to the next pulse of current which is thereupon effective to charge said capacitor to a positive potential sufficient to override said negative biasing potential, thereby to drive said amplifier device into conduction and thereby to drive current through the output-circuit winding of said amplifier to reset said core to said boundary state of reference polarity.

6. Apparatus as claimed in claim 5 characterized in the provision of means responsive to the resetting of said core to said boundary state of reference polarity for developing an $(n+1)$ count signal.

7. Apparatus as claimed in claim 6 further characterized in that said output-circuit winding of said amplifier and said compensating winding are regeneratively poled so that said current through said output-circuit winding induces in said compensating winding a voltage of a polarity to continue said amplifier biased for conduction until said core is completely reset.

8. Apparatus as claimed in claim 6 further characterized in that both said input and said compensating windings are so poled relative to said output-circuit winding of said amplifier that said current through said output-circuit winding induces in both said input and compensating windings voltages of the same polarity and of a magnitude to maintain said amplifier biased for conduction until said core is completely reset.

9. A counter circuit comprising: a magnetic core of high magnetic retentivity and capable of being switched from a boundary state of magnetic remanence of reference polarity to a boundary state of opposite polarity in $n$ discrete changes of flux level, where $n$ is an integer larger than one; an input winding coupled to said core; a resistance having one end connected to one end of said input winding; a series circuit connected in shunt with said resistance, said series circuit comprising a compensating winding coupled to said core, a capacitor and a source of biasing voltage for charging said capacitor; an amplifier device having input and output circuits, said output circuit including a third winding coupled to said core; means connecting said capacitor in shunt with the input circuit of said amplifier for biasing said amplifier beyond cut-off; means for connecting a source of to-be-counted spaced-apart pulses of substantially equal volt-second integral between the other end of said input winding and the other end of said resistance for driving spaced-apart pulses of current through said input winding to change, in response to each current pulse, the flux level of said core by one of said $n$ discrete changes of level, thereby to induce a voltage in said compensating winding opposing the flow of said pulse current into said capacitor, thereby to maintain said amplifier device biased beyond cut-off, thereby in response to a succession of $n$ such to-be-counted pulses to drive said core from said boundary state of magnetic remanence of reference polarity to said boundary state of opposite polarity, whereupon substantially no voltage is induced in either said input or compensating windings in response to the next succeeding pulse of current flow therethrough, whereupon said next succeeding current pulse charges said capacitor to a potential overriding said biasing voltage, thereby to drive said amplifier into conduction and thereby in response to amplifier current flow through said third winding to reset said core to said boundary state of reference polarity; and means responsive to the resetting of said core to said boundary state of reference polarity for producing an $(n+1)$ count signal.

10. Apparatus as claimed in claim 9 further characterized in that said third winding of said core and said compensating winding are regeneratively poled so that said current through said third winding induces in said compensating winding a voltage of a polarity to continue said amplifier biased for conduction until said core is completely reset.

11. Apparatus as claimed in claim 9 further characterized in that both said input and said compensating windings are so poled relative to said third winding of said core that said current through said third winding induces in both said input and compensating windings voltages of the same polarity and of a magnitude to continue said amplifier biased for conduction until said core is completely reset.

12. A counter circuit comprising: a first magnetic core capable of assuming either of two stable states of magnetic remanence; a second magnetic core of high magnetic retentivity and capable of being switched from a boundary state of magnetic remanence of reference polarity to a boundary state of opposite polarity through $n$ intermediate magnetic states each corresponding to a different level of flux density, where $n$ is an integer; a transfer loop interconnecting said first and second cores, said transfer loop including an output winding coupled to said first core, an input winding coupled to said second core, an asymmetrically conducting device connecting one end of said output winding to one end of said input winding, and a resistance connecting the other end of said output winding to the other end of said input winding; an amplifier device having input and output electrodes; a compensating winding coupled to said second core, said compensating winding having one end connected to the junction of said resistance and said input winding and its other end connected to an input electrode of said amplifier device; means for applying a biasing voltage to said input electrode to bias said amplifier device into non-conduction; a third winding coupled to said second core and included in the output circuit of said amplifier device, said third winding being wound in such sense as to be regeneratively coupled to said compensating winding; means responsive to the first of a series of spaced-apart to-be-counted pulses for switching said first core from one to the other of its stable states for inducing a voltage in said first-core output winding to drive a pulse of transfer current around said transfer loop and through said second-core input winding to change the flux density in said second core from one of said intermediate states to the next, thereby in response to said flux change to induce a voltage in said compensating winding of a polarity tending to maintain said amplifier device biased non-conducting; means for resetting said first core to said one stable state in preparation for the next pulse to be counted, thereby after a succession of applied to-be-counted pulses and successive switchings of said first core to drive the flux density of said second core to said boundary state of magnetic remanence of said opposite polarity, whereupon in response to the next pulse of transfer current substantially no voltage is induced in said input and compensating windings and the potential at the junction of said resistance and said input winding in response to increased transfer current flow changes sufficiently to override said bias and drive said amplifier device into conduction, thereby in response to current flow through said third winding of said second core to induce a voltage in said compensating winding such as to maintain said amplifier device conducting, thereby to reset said second core to said boundary state of reference polarity; and means responsive to the resetting of said second core for developing an $(n+2)$ count signal.

13. A counter circuit comprising: a magnetic core of high magnetic retentivity and capable of being switched from a boundary state of magnetic remanence of reference polarity to a boundary state of opposite polarity through $n$ intermediate magnetic states each corresponding to a different level of flux density, where $n$ is an integer; an input winding coupled to said core; a resistance having one end connected to one end of said input winding; an amplifier device having input and output electrodes; a compensating winding coupled to said core and having one end connected to the junction of said resistance and said input winding and the other end connected to an input electrode of said amplifier device; means for applying a biasing potential to said input electrode for biasing said amplifier device into non-conduction; a third winding coupled to said core and included in the output circuit of said amplifier device; means for connecting a source of spaced-apart to-be-counted pulses, each of substantially equal volt-second integral between the other end of said input winding and the other end of said resistance for driving, in response to a pulse to be counted, a current pulse through said input winding to change the flux density in said core from one of said intermediate states to the next, thereby in response to said flux change to produce a voltage in said compensating winding of a polarity tending to maintain said amplifier device biased in non-conducting state, thereby after a succession of pulses to be counted and a consequent succession of current pulses through said input winding, to drive the flux density of said core to said boundary state of magnetic remanence of said opposite polarity, whereupon, in response to the next pulse of current through said input winding, substantially no voltage is induced in said input and compensating windings and the potential at said junction of said resistance and input winding changes sufficiently to override said bias on the input electrode of said amplifier device, thereby to drive said amplifier device into conduction and thereby to drive current through said third winding, said third winding being regeneratively coupled to said compensating winding, thereby to induce in said compensating winding a voltage of a polarity to maintain said amplifier device biased for conduction until said core is reset to said boundary state of reference polarity; and means responsive to the resetting of said core to said boundary state of reference polarity for developing an $(n+2)$ count signal.

References Cited in the file of this patent

UNITED STATES PATENTS

| | | |
|---|---|---|
| 2,704,842 | Goodell et al. | Mar. 22, 1955 |
| 2,708,722 | An Wang | May 17, 1955 |
| 2,713,675 | Schmitt | July 19, 1955 |
| 2,754,430 | Isborn | July 10, 1956 |

OTHER REFERENCES

"Multi-Stable Magnetic Techniques," by J. D. Goodell and T. Lode, published in Radio News, December 1951, pp. 3–5.

Disclaimer 2,992,393.—*Robert L. Gray*, Broomall, and *David A. Starr, Jr.*, Berwyn, Pa. MAGNETIC COUNTER CIRCUIT. Patent dated July 11, 1961. Disclaimer filed July 8, 1963, by the assignee, *Burroughs Corporation.*

Hereby enters this disclaimer to claims 12 and 13 of said patent.

[*Official Gazette October 1, 1963.*]